United States Patent [19]

Mueller

[11] Patent Number: 5,139,831
[45] Date of Patent: Aug. 18, 1992

[54] IMPACT MODIFIED MEDICAL FILM WITH PH CONTROL

[75] Inventor: Walter B. Mueller, Inman, S.C.

[73] Assignee: W. R. Grace & Co.-Conn., Duncan, S.C.

[21] Appl. No.: 488,154

[22] Filed: Mar. 2, 1990

[51] Int. Cl.$^5$ .................. B32B 27/30; B29C 47/06; B65D 65/02
[52] U.S. Cl. .................. 428/34.3; 428/330; 428/483; 428/516; 428/520; 264/211; 264/211.23
[58] Field of Search .................. 428/516, 34.3, 330, 428/483

[56] References Cited

U.S. PATENT DOCUMENTS

| | | | |
|---|---|---|---|
| 4,188,443 | 2/1980 | Mueller et al. | 428/216 |
| 4,401,536 | 8/1983 | Lundell et al. | 204/159 |
| 4,643,926 | 2/1987 | Mueller | 428/35 |
| 4,726,997 | 2/1988 | Mueller et al. | 428/480 |

FOREIGN PATENT DOCUMENTS

0228819 3/1990 European Pat. Off. .
0008680 9/1989 World Int. Prop. O. .

*Primary Examiner*—P. C. Sluby
*Attorney, Agent, or Firm*—William D. Lee, Jr.; Jennifer L. Skord; Mark B. Quatt

[57] ABSTRACT

An impact resistant film suitable for medical solution pouches and the packaging of parenteral materials generally includes an interior layer of an ethylene vinyl acetate copolymer and outer layers of a propylene homopolymer or copolymer blended with a styrene ethylene butylene styrene copolymer. In some cases, a flexible copolyester may be substituted for one of the outer blend materials. Sacrificial layers may be optionally included on one or both outer surfaces of the film to improve processing. Additional interior layers of olefin polymers and copolymers such as EVA, and polymeric adhesive layers can also be included. At least one of the EVA or polymeric adhesive layers preferably includes a carbonate of an alkali metal. The flexible copolyester layer preferably includes a high molecular weight stabilizer.

31 Claims, 3 Drawing Sheets

IMPACT MODIFIED MEDICAL FILM WITH PH CONTROL

This invention relates to autoclavable flexible films suitable for the packaging of medical solutions.

Currently, it is common medical practice to supply liquids such as medical solutions for parenteral administration in the form of disposable, flexible pouches. These pouches should be characterized by collapsibility, transparency, and adequate mechanical strength. They must also be able to resist the relatively high temperatures required for heat sterilization of their contents, for example in an autoclave. Typically, medical solutions and the like are autoclaved at about 253° F. for periods of 15 to 30 minutes.

Presently, such flexible pouches are typically made from a highly plasticized polyvinyl chloride. While meeting the requirements mentioned above, polyvinyl chloride may have some undesirable properties for use as a medical solution pouch because of the possibility of migration of plasticizer from the polyvinyl chloride into the medical solution or the other contents of the pouch so that the solution may become contaminated by potentially toxic material. A question has also arisen concerning whether PVC is adequately chemically neutral to medical solutions. It has also been found that polyvinyl chloride becomes brittle at relatively low temperatures.

Embrittlement and stress-cracking, particularly of the outer surface of medical pouches, has been found to occur in other non-PVC pouches. It is desirable to provide a pouch for the packaging of medical solution which substantially reduces or eliminates stress-cracking and embrittlement of the pouch material.

When packaging medical solutions, the amount of extractables in the medical solution derived from the packaging material must be strictly controlled. A medical solution is also often pH sensitive, and the pH of the solution must also be kept within strict limits.

Of interest is U.S. Pat. No. 4,401,536 issued to Lundell et al which discloses the use of a blend of medical grade radiation-stabilized polypropylene and a copolymer of ethylene and a comonomer selected from the group consisting of vinyl esters of saturated carboxylic acids and alkyl esters of alpha, beta ethylenically unsaturated carboxylic acids, the blend being irradiated.

Also of interest is U.S. Pat. No. 4,643,926 issued to Mueller which discloses a flexible film for medical solution pouches generally including a sealant layer of ethylene propylene copolymer, modified ethylene propylene copolymer, or flexible copolyester; one or more interior layers including elastomeric polymeric materials such as very low density polyethylene; and an outer layer of ethylene propylene copolymer or a flexible copolyester.

Also of interest is U.S. Pat. No. 4,726,997 issued to Mueller et al which discloses a chemically stabilized film in which extractables are controlled by the use of a high molecular weight stabilizer in a copolyester layer, and solution pH is controlled by the addition of a carbonate of an alkali metal to a modified ethylene vinyl acetate copolymer.

European Patent Application 228819 (Raniere et al) discloses a film including a layer of a blend of polypropylene polymer and styrene ethylene butylene styrene copolymer, and a layer of copolyester.

OBJECTS

It is an object of the invention to provide a film useful in medical end-use applications when made into a pouch, the film formulated to control the film-derived extractables in a medical solution contained in the pouch.

It is also an object to provide a film useful in making a medical solution pouch, wherein the film is formulated to help control the variations in solution pH caused by the pouch material.

It is an object of the present invention to provide a film suitable for the packaging of medical solutions, the film having good impact resistance and flexibility.

Another object of the present invention is to provide a film suitable for the packaging of medical solutions characterized by good optical properties and a low degree of haze after autoclaving of the package.

Still another object of the present invention is to provide a film suitable for the packaging of medical solutions characterized by high mechanical strength.

DEFINITIONS

The terms "flexible" and the like and "elastomeric" and the like are used herein to define specific polymeric materials as well as characteristics of a resulting pouch or bag whereby improved flexibility and/or collapsibility of the pouch or bag is obtained by the use of these specific polymeric materials. Flexible materials may be characterized by a modulus of preferably less than 50,000 PSI (ASTM D-882-81) and more preferably less than 40,000 PSI (ASTM D-882-81).

The term "film" and the like refers to a thermoplastic material suitable for packaging and having one or more layers of polymeric materials which may be bonded by any suitable means well known in the art.

The term "polymer", "polymeric", and the like unless specifically defined or otherwise limited, generally includes homopolymers, copolymers and terpolymers and blends and modifications thereof.

The term "intermediate" and the like is used herein to refer to a layer of a multilayer film which is not a skin or surface layer, or sealant layer, of the film.

The term "melt index" is used herein as the amount, in grams, of a thermoplastic resin which can be forced through a given orifice under a specified pressure and temperature within 10 minutes. The value should be determined in accordance with ASTM D 1238-79.

The term "ethylene vinyl acetate copolymer" (EVA) is used herein to refer to a copolymer formed from ethylene and vinyl acetate monomers wherein the ethylene derived units in the copolymer are present in major amounts and the vinyl acetate derived units in the copolymer are present in minor amounts.

The term "ethylene propylene copolymer" is used herein to refer to a copolymer formed from polypropylene monomer and minor amounts, usually less than 6%, of ethylene.

The term "copolyester" and the like is applied to polyesters synthesized from more than one diol and a dibasic acid. Copolyesters as used herein may also be characterized as copolymers of polyether and polyethylene terephthalate. More preferably copolyesters as used herein may be characterized as polymeric materials derived from 1,4 cyclohexane dimethanol, 1,4 cyclohexane dicarboxylic acid, and polytetramethylene glycol ether, or equivalents of any of the above, as reactants.

The term "modified" and the like is used herein to refer to a polymeric material in which some or all of the substituents are replaced by other materials, providing a change in properties such as improved impact resistance, flexibility or elastomeric properties. In the case of modified ethylene propylene copolymer, the modification is provided by a rubbery block copolymer such as commercially available under the trademark Kraton from the Shell Chemical Company.

SUMMARY OF THE INVENTION

An impact resistant film in accordance with the invention comprises two outer layers of a blend of ethylene propylene copolymer and a styrene ethylene butylene styrene copolymer; and an intermediate layer disposed between the two outer layers, and comprising ethylene vinyl acetate copolymer and a carbonate of an alkali metal.

In another aspect of the invention, an impact resistant film comprises a first outer layer comprising a blend of ethylene propylene copolymer and styrene ethylene butylene styrene copolymer; a second outer layer comprising a copolyester; a central layer comprising ethylene vinyl acetate copolymer; and a polymeric adhesive layer disposed between and adhering the central layer to the second outer layer; at least one of the central layer and polymeric adhesive layer further comprising a carbonate of an alkali metal.

In another aspect of the invention, an impact resistant film comprises a first outer layer comprising a blend of ethylene propylene copolymer and styrene ethylene butylene styrene copolymer; a second outer layer comprising a copolyester; a central layer comprising an ethylene vinyl acetate copolymer ; and polymeric adhesive layers disposed between and adhering the respective outer layers to the central layer; at least one of the central layer and polymeric adhesive layers further comprising a carbonate of an alkali metal.

In still another aspect of the invention, an impact resistant film comprises two outer layers of a blend of ethylene propylene copolymer and a styrene ethylene butylene styrene copolymer; a central layer comprising a fractional melt index ethylene vinyl acetate copolymer; and an intermediate layer disposed between each of the two outer layers and the central layer respectively and comprising ethylene vinyl acetate copolymer having a melt index greater than about 1.0, at least one of the central layer and intermediate layers further comprising a carbonate of an alkali metal.

In still another aspect of the invention, an impact resistant film comprises two outer layers of a blend of ethylene propylene copolymer and a styrene ethylene butylene styrene copolymer; a central layer comprising ethylene vinyl acetate copolymer having a melt index greater than about 1.0; and an intermediate layer disposed between each of the two outer layers and the central layer respectively and comprising a fractional melt index ethylene vinyl acetate copolymer; at least one of the central layer and intermediate layers further comprising a carbonate of an alkali metal.

In yet another aspect of the invention, an impact resistant film comprises a first outer layer comprising a blend of ethylene propylene copolymer and a styrene ethylene butylene styrene copolymer; a second outer layer comprising a copolyester; a central layer comprising a fractional melt index ethylene vinyl acetate copolymer; an intermediate layer disposed between each of the two outer layers and the central layer respectively and comprising ethylene vinyl acetate copolymer having a melt index greater than about 1.0; and a polymeric adhesive layer disposed between and adhering the second outer layer to an intermediate layer; at least one of the central layer, polymeric adhesive layer, and intermediate layers further comprising a carbonate of an alkali metal.

In yet another aspect of the invention an impact resistant film comprises a first outer layer comprising a blend of ethylene propylene copolymer and a styrene ethylene butylene styrene copolymer; a second outer layer comprising a copolyester; a central layer comprising ethylene vinyl acetate copolymer having a melt index greater than about 1.0; an intermediate layer disposed between the first outer layer and the central layer and comprising a fractional melt index ethylene vinyl acetate copolymer; and a polymeric adhesive layer disposed between and adhering the second outer layer to the central) layer; at least one of the central layer, polymeric adhesive layer, and intermediate layer further comprising a carbonate of an alkali metal.

In yet another aspect of the invention, a method of making an impact resistant film comprises providing a blend of an ethylene propylene copolymer and a styrene ethylene butylene styrene copolymer; and coextruding the blend as a first and second melt stream, and an intermediate melt stream of ethylene vinyl acetate copolymer and a carbonate of an alkali metal to form a tubular film.

In yet another aspect of the invention, a method of making an impact resistant film comprises providing a blend of an ethylene propylene copolymer and a styrene ethylene butylene styrene copolymer; coextruding a first melt stream of a copolyester, a second melt stream of an ethylene vinyl acetate copolymer , a third melt stream of the blend of an ethylene propylene copolymer and a styrene ethylene butylene styrene copolymer; and a melt stream of a polymeric adhesive disposed between the first and second melt streams to form a tubular film; at least one of the second and polymeric adhesive melt streams further comprising a carbonate of an alkali metal.

In still another aspect of the invention, a method of making an impact resistant film comprises providing a blend of an ethylene propylene copolymer and a styrene ethylene butylene styrene copolymer; and coextruding a first melt stream of a copolyester, a second melt stream of an ethylene vinyl acetate copolymer, a third melt stream of the blend of ethylene propylene copolymer and styrene ethylene butylene styrene copolymer, and two melt streams of a polymeric adhesive disposed between the first and second melt streams, and the second and third melt streams respectively, to form a tubular film; at least one of the second and polymeric adhesive melt streams further comprising a carbonate of an alkali metal.

In still another aspect of the invention, a method of making an impact resistant film comprises providing a blend of an ethylene propylene copolymer and a styrene ethylene butylene styrene copolymer; and coextruding the blend of an ethylene propylene copolymer and a styrene ethylene butylene styrene copolymer as a first and second melt stream, a central melt stream of a fractional melt index ethylene vinyl acetate copolymer, and two intermediate melt streams of ethylene vinyl acetate copolymer having a melt index greater than about 1.0, such that the central melt stream is disposed between the intermediate melt streams as the tubular film is coextruded, and the blend of an ethylene propylene copolymer and a styrene ethylene butylene styrene copolymer forms outer layers of the final tubular film; at least one of the central and intermediate melt streams further comprising a carbonate of an alkali metal.

In still another aspect of the invention, a method of making an impact resistant film comprises providing a blend of an ethylene propylene copolymer and a styrene ethylene butylene styrene copolymer; and coextruding the blend of an ethylene propylene copolymer and a styrene ethylene butylene styrene copolymer as a first and second melt stream, a central melt stream of ethylene vinyl acetate copolymer having a melt index greater than about 1.0, and two intermediate melt streams of a fractional melt index ethylene vinyl acetate copolymer, such that the central melt stream is disposed between the intermediate melt streams as the tubular film is coextruded, and the blend of an ethylene propylene copolymer and a styrene ethylene butylene styrene copolymer forms outer layers of the final tubular film; at least one of the central and intermediate melt streams further comprising a carbonate of an alkali metal.

In still another aspect of the invention, a method of making an impact resistant film comprises providing a blend of an ethylene propylene copolymer and a styrene ethylene butylene styrene copolymer; and coextruding a first melt stream of a copolyester, a second melt stream of the blend of an ethylene propylene copolymer and a styrene ethylene butylene styrene copolymer; and, a central melt stream of a fractional melt index ethylene vinyl acetate copolymer disposed between two intermediate melt streams of ethylene vinyl acetate copolymer having a melt index greater than about 1.0, and a melt stream of a polymeric adhesive, such that the first and second melt streams form outer layers of the final tubular film, and the polymeric adhesive is disposed between the first melt stream and an intermediate melt stream; and at least one of the central, polymeric adhesive, and intermediate melt streams further comprises a carbonate of an alkali metal.

In still another aspect of the invention, a method of making an impact resistant film comprises providing a blend of an ethylene propylene copolymer and a styrene ethylene butylene styrene copolymer; and coextruding a first melt stream of a copolyester, a second melt stream of an ethylene vinyl acetate copolymer having a melt index greater than about 1.0, a third melt stream of the blend of an ethylene propylene copolymer and a styrene ethylene butylene styrene copolymer; and a fourth melt stream of a fractional melt index ethylene vinyl acetate copolymer disposed between the second and third melt streams, and a fifth melt stream of a polymeric adhesive disposed between the first and second melt streams, such that the first and third melt streams form outer layers of the final tubular film; at least one of the second, fourth, and fifth melt streams further comprising a carbonate of an alkali metal.

In still another aspect of the invention, an impact resistant film comprises a first outer layer comprising a blend of ethylene propylene copolymer and styrene ethylene butylene styrene copolymer; a second outer layer comprising copolyester, and between about 0.3% and 1%, by weight of the copolyester, of a high molecular weight stabilizer; a central layer comprising ethylene vinyl acetate copolymer; and a polymeric adhesive layer disposed between and adhering the central layer to the second outer layer.

In still another aspect of the invention an impact resistant film comprises a first outer layer comprising a blend of ethylene propylene copolymer and styrene ethylene butylene styrene copolymer; a second outer layer comprising copolyester, and between about 0.3% and 1%, by weight of the copolyester, of a high molecular weight stabilizer; a central layer comprising ethylene vinyl acetate copolymer; and polymeric adhesive layers disposed between and adhering the respective outer layers to the central layer.

In still another aspect of the invention an impact resistant film comprises a first outer layer comprising a blend of ethylene propylene copolymer and styrene ethylene butylene styrene copolymer; a second outer layer comprising copolyester, and between about 0.3% and 1%, by weight of the copolyester, of a high molecular weight stabilizer; a central layer comprising a fractional melt index ethylene vinyl acetate copolymer; an intermediate layer disposed between each of the two outer layers and the central layer respectively and comprising ethylene vinyl acetate copolymer having a melt index greater than about 1.0; and a polymeric adhesive layer disposed between and adhering the second outer layer to an intermediate layer.

In still another aspect of the invention an impact resistant film comprises a first outer layer comprising a blend of ethylene propylene copolymer and a styrene ethylene butylene styrene copolymer; a second outer layer comprising copolyester, and between about 0.3% and 1%, by weight of the copolyester, of a high molecular weight stabilizer; a central layer comprising ethylene vinyl acetate copolymer having a melt index greater than about 1.0; an intermediate layer disposed between the first outer layer and the central layer and comprising a fractional melt index ethylene vinyl acetate copolymer; and a polymeric adhesive layer disposed between and adhering the second outer layer to the central layer.

DETAILED DESCRIPTION OF THE PREFERRED EMBODIMENTS

Figure 1:
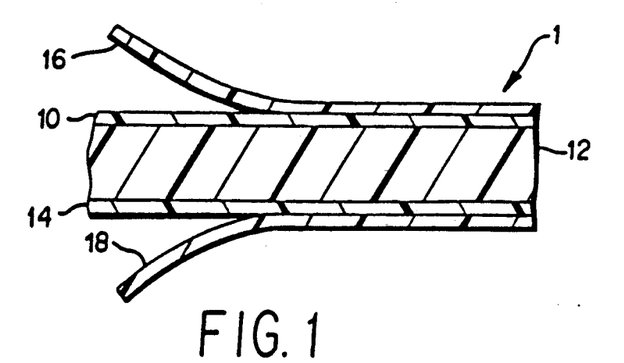
FIG. 1 is a schematic cross-section of a film made in accordance with the invention.

FIG. 1 shows a three layer impact resistant film 1 in accordance with the present invention. Sealant layer 10 comprises a blend of ethylene propylene copolymer (EPC) and a styrene ethylene butylene styrene copolymer (SEBS). A suitable EPC is Eltex KS 409X6206 available from Solvay. This copolymer has an ethylene content of about 3.8%. Other ethylene propylene copolymers, and polypropylenes (PP) may be used. A suitable PP is P 7673-930P available from Eastman Chemical. The SEBS is preferably Kraton G 1652. This particular material may be regarded as a thermoplastic rubber, and also as a block copolymer with polystyrene end blocks and a rubbery polyethylene butylene midblock. A pre-compounded blend of EPC and SEBS is available from Ferro as Z 4650. This material is a modified EPC i.e. EPC compounded with about 20% of a Kraton SEBS thermoplastic rubber. The EPC component of the compounded material is a low modulus, low melting point EPC available from Fina as Z 9450.

Although outer layer 14 may be identical to outer layer 10 in terms of composition and thickness, these layers may differ depending on the particular end use. For example, the inner sealant layer 10 may have 20% SEBS to enhance impact resistance, while outer layer 14 may have only 10% SEBS. The SEBS adversely affects optics to some extent. Having a higher % SEBS in the sealant layer instead of the outer layer masks to some extent the loss in optical quality.

The blend in outer layers 10 and 14 is preferably between 70% and 95% ethylene propylene copolymer, and 5% to 30% by weight of styrene ethylene butylene styrene copolymer.

Intermediate layer 12, disposed between the two outer layers 10 and 14, comprises a blend of ethylene vinyl acetate copolymer (EVA) and a carbonate of an alkali metal. Preferably, the EVA has a vinyl acetate content of between about 18% and 35% by weight of the EVA. Even more preferably, the EVA has a vinyl acetate content of about 28% by weight of the EVA. Several commercially available EVA resins are suitable for intermediate layer 12. These include Elvax 3175 having a melt index of 6 and a 28% vinyl acetate content by weight of the EVA. Also useful is Elvax 3182, a 3 melt index resin with a vinyl acetate content of about 28% by weight of the EVA. Both of these resins are available from du Pont. Additionally, Exxon 767.36 (2.5 melt index, 30% vinyl acetate) and Exxon 760.36 (3 melt index, 27.5% vinyl acetate) are also suitable for intermediate layer 12.

Many medical solutions are pH sensitive and such solutions should not vary greatly in acidity or basicity. Preferably between about 0.01% and 1%, by weight of the intermediate layer, of a carbonate of an alkali metal, preferably sodium, is blended into the EVA prior to extrusion.

The intermediate layer 12 comprises preferably between 60 and 90% and more preferably about 80% of the total film thickness exclusive of sacrificial layers to be described hereafter.

When coextruding the present film structure, differences in viscosity of the respective resins can make coextrusion difficult to perform satisfactorily. For example, severe melt ripples can sometimes result. In these situations, an additional outer layer of for example low density polyethylene is adhered to each of the two outer layers 10 and 14. These additional layers 16 and 18 function as sacrificial layers which are stripped away after the coextruded film has been produced. This allows the blend layers 10 and 14 to function as sealant layers if necessary.

Figure 2:
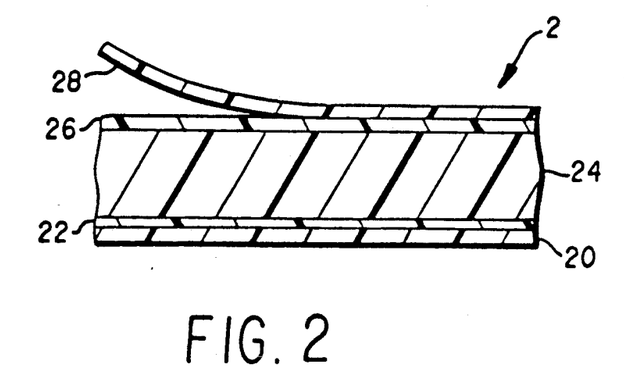
FIG. 2 is a schematic cross-section of another film made in accordance with the invention.

FIG. 2 shows a four layer film 2 made in accordance with the present invention. Outer layer 26 is preferably a blend of EPC and the SEBS material described for outer layers 10 and 14 of the three layer structure.

Interior layer 24 preferably comprises a blend of an EVA and an alkali metal carbonate, such as those described earlier. The second outer layer 20 is a flexible copolyester.

Adhesive layer 22 is a polymeric adhesive such as a modified ethylene methyl acrylate or modified ethylene vinyl acetate copolymer. Certain ethylene unsaturated ester copolymers, unmodified, may also be suitable for layer 22 in order to bond the interior EVA layer 24 to outer copolyester layer 20.

In addition, other polymeric adhesive materials may be suitable for layer 22 as well as the adhesive layers of other embodiments of the present invention. The choice of these adhesive materials depends on the selection of resins for the remaining layers of the film structure, in particular the resin layers which will be bonded by the adhesive layer. These additional adhesives are preferably chemically modified adhesives, often with acid or acid anhydride functionalities, and include chemically modified linear low density polyethylene, very low density polyethylene, high density polyethylene and polypropylene. In embodiments of the present invention having one or more polymeric adhesive layers, the adhesive layer or layers preferably includes between about 0.01% and 1%, by weight of the adhesive layer, of a carbonate of an alkali metal as described earlier in the specification.

As with the film described and depicted in FIG. 1, the four layer film of FIG. 2 may in some cases require a sacrificial layer in order to provide a coextruded film substantially free of melt ripples. For example, if the flexible copolyester used for second outer layer 20 is ECDEL 9965, no sacrificial layer is necessary. However, if ECDEL 9967 is the particular flexible copolyester used, then a sacrificial layer Z8 will be necessary. This sacrificial layer may be a low density polyethylene such as described above for the film of FIG. 1. The sacrificial layer is depicted as layer 28 in FIG. 2.

In both FIGS. 1 and 2, the sacrificial layers are shown as partially peeled away from the primary film structure.

In an alternative embodiment for film 2, the interior layer 24 is an unblended EVA, and second outer layer 20 includes between about 0.03% and 1%, by weight of the copolyester, of a high molecular weight stabilizer.

Limiting the amount of extractables that can migrate from the outer copolyester layer into the medical solution is of primary importance. Blending a high molecular weight stabilizer, such as Irganox 1010 ™ available from Ciba-Geigy Corporation, into the copolyester prior to extrusion of the film, limits the amount of extractables that enter the medical solution.

Although Irganox 1010 is currently added to commercial copolyesters in the amount of about 0.2% by weight of the resin, it has been found that this amount of additive is insufficient to control the extraction of degraded copolyester material into medical solutions. Amounts of the high molecular weight stabilizer above about 1% by weight of the copolyester are not preferred because the additive itself can become an extractable material.

Film structures of the present invention which have a layer of copolyester can include either the carbonate of an alkali metal (in one or more of the EVA layers or the polymeric adhesive layers), a high molecular weight stabilizer (in the copolyester layer), or both the carbonate of an alkali metal and a high molecular weight stabilizer.

Figure 3:
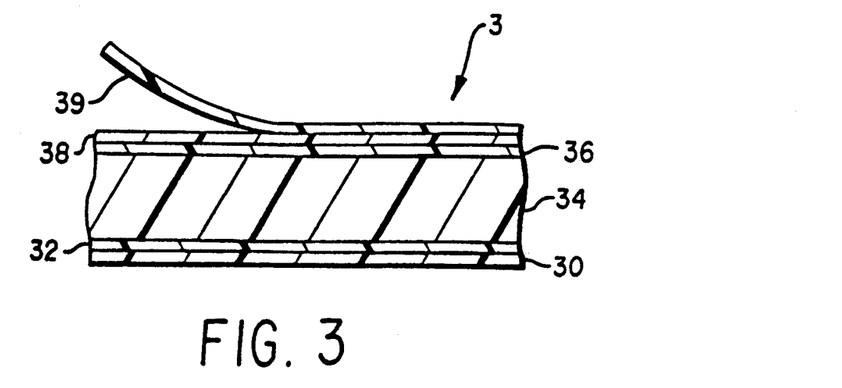
FIG. 3 is a schematic cross-section of yet another film made in accordance with the present invention.

FIG. 3 shows a five layer film 3 substantially like the four layer film described earlier, but with an additional layer 36 of a polymeric adhesive such as a modified ethylene methyl acrylate copolymer or a modified ethylene vinyl acetate copolymer. Thus, layer 38 of FIG. 3 corresponds to layer 26 of FIG. 2, layer 34 of FIG. 3 corresponds to layer 24 of FIG. 2, layer 32 of FIG. 3 corresponds to layer 22 of FIG. 2, and layer 30 of FIG. 3 corresponds to layer 20 of FIG. 2.

The outer layers 30 of FIG. 3 and 20 of FIG. 2 are a flexible copolyester with or without the inclusion of between about 0.3 and 1%, by weight of the copolyester, of a high molecular weight stabilizer.

More preferably, a copolymer of polyether and polyethylene terephthalate, such as Eastman ECDEL 9965 from Eastman Chemical Products, Inc. is used for outer layers 30 and 20. Other suitable flexible copolyesters are ECDEL 9966 and ECDEL 9967 all available from Eastman. These particular copolyesters are characterized by inherent viscosities ranging from 1.05 to 1.28, and by the use of 1,4 cyclohexane dimethanol, 1,4 cyclohexane dicarboxylic acid, and polytetramethylene glycol ether as reactants in producing the flexible copolyester resins.

As with the four layer structure of FIG. 2, the five layer film may include an additional layer 39 of a material such as low density polyethylene which can be coextruded with the five layer film for processing purposes but later peeled away from the remainder of the structure.

Various polymeric materials or blends of materials may be used for adhesive layers 32, 36 and 22 provided that the material used imparts sufficient adhesion between outer layers and the central or interior EVA layer. When a flexible copolyester is used for outer layer 30, the preferred material for layer 32 is a chemically modified ethylene methyl acrylate copolymer with a carboxylic acid or acid anhydride functionality. An especially preferred commercial resin is Plexar 3382 available from Quantum.

Other suitable commercial resins are CXA E162 and CXA E361, both chemically modified EVA materials available from du Pont.

Figure 4:
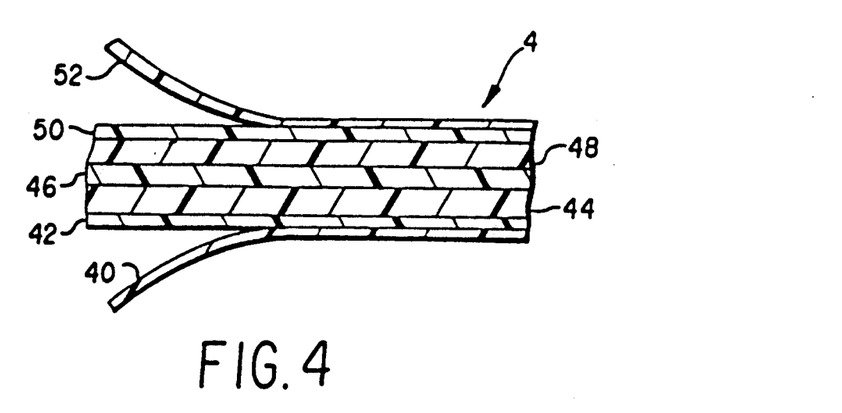
FIG. 4 is a schematic cross-section of still another film made in accordance with the present invention.

FIG. 4 shows an alternative embodiment being a five layer film 4. In applications where improved melt strength is required, the film described for FIG. 1 can be further improved by introducing a fractional melt index EVA into the center of the structure so that layer 46 of FIG. 4 is a fractional melt index (i.e. less than 1.0 melt index) EVA, and layers 48 and 44 disposed on either side of the layer 46, comprise the high vinyl acetate EVA described earlier for central layer 12. The total EVA content of this alternative embodiment is still preferably between 60% and 90%, and more preferably about 80% of the total film thickness. Examples of a fractional melt index EVA are Elvax 3135 and 3165, both available from du Pont.

A carbonate of an alkali metal is preblended into the EVA forming one or more of layers 44, 46, and 48.

In one variation of this alternative embodiment, the central layers 44, 46, and 48 may be reversed. In this variation, the fractional melt index EVA would form layers 44 and 48, and the central layer 46 would comprise the high vinyl acetate EVA.

Layers 42 and 50 of FIG. 4 correspond to layers 14 and 10 respectively of FIG. 1. Sacrificial layers 40 and 52 of FIG. 4 correspond to sacrificial layers 18 and 16 respectively of FIG. 1.

The multilayer film 4 of FIG. 4 can therefore be described as a five layer film, or else as a seven layer film wherein the outer layers 40 and 52, being sacrificial layers, are removed from the film structure after coextrusion but before forming the film into a pouch or bag such as a medical solution pouch.

Figure 5:
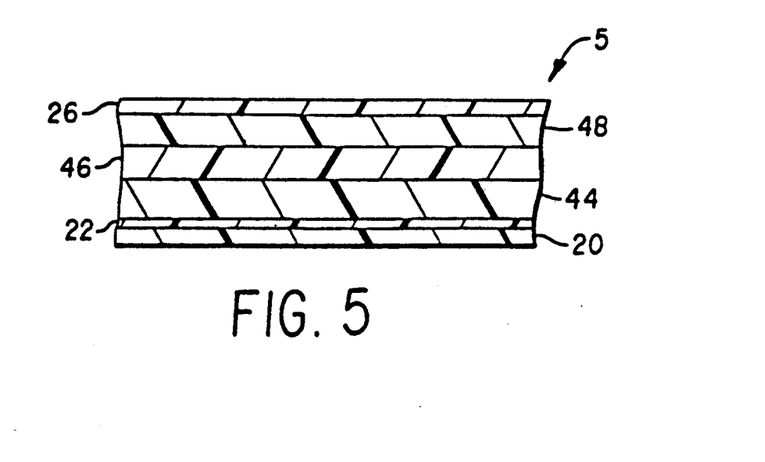
FIG. 5 is a schematic cross-section of another film made in accordance with the present invention.

In FIG. 5, a six layer film structure 5 is shown. This structure is essentially a modification of the structure shown in FIG. 2, and in particular the structure of FIG. 2 modified so that a sacrificial layer is not necessary. In this embodiment, the modified structure of FIG. 2 is further modified by introducing a central layer 46 of a fractional melt index EVA disposed between two intermediate layers 44 and 48 respectively of an ethylene vinyl acetate copolymer having a melt index greater than about 1.0. Thus, the modification utilized for the central layers of FIG. 4 is used in the embodiment depicted in FIG. 5. Reference numerals in FIG. 5 are the same as like numbered reference numerals depicted in FIGS. 2 and 4.

Figure 6:
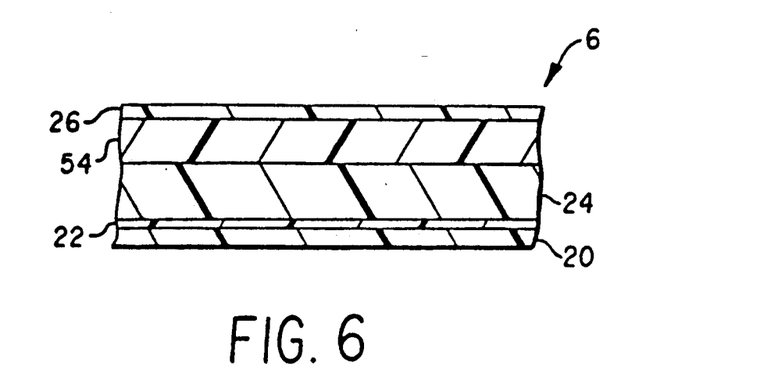
FIG. 6 is a schematic cross-section of yet another film made in accordance with the present invention.

In FIG. 6, a five layer film structure 6 is shown. This structure is essentially a modification of the structure shown in FIG. 2, and in particular the structure of FIG. 2 modified so that a sacrificial layer is not necessary. In such an instance, the modification may have inadequate melt strength. To overcome this deficiency, the modified structure of FIG. 2 may be further modified by introducing a fractional melt index EVA (e.g. Elvax 3135 or Elvax 3165) into the structure as layer 54.

The films as described are preferably manufactured by a cast coextrusion process.

EXAMPLES

Exemplary multi-layer structures are cast coextruded and irradiated. These structures are viewed as potential replacements for polyvinyl chloride bags. Examples 1 through 14, in part reflected in the detailed description of the preferred embodiments hereinbefore described, are listed below with their respective formulations. The list for each example begins with a sacrificial layer (e.g. LDPE) if present, followed by the inside or sealant layer, and ending with the outside layer. Unless otherwise denoted, Examples 1-18 include the following materials:

PP: P 7673-930P
$EPC_1$: Eltex KS409x6206;
$SEBS_1$: Kraton G 1652
flexible copolyester$_1$: ECDEL 9967;
flexible copolyester$_2$: ECDEL 9965
LDPE: PE 3404
$EVA_1$: Elvax 3175
$EVA_2$: Exxon 767.36
$EVA_3$: Elvax 3182-2
$EVA_4$: Exxon 760.36
modified EVA: Bynel E361.
$EPC_2 + SEBS_2$: Z 4650
$EPC_3 + M$ 7853-368A (Eastman) (Block copolymer)
$Na_2CO_3$
HMWS: High Molecular Weight Stabilizer (Irganox TM 1010)

In Example 1, the multilayer film comprises LDPE/90% $EPC_1$+10% $SEBS_1$/99.9% $EVA_1$+0.1 $Na_2CO_3$/90% $EPC_1$+10% $SEBS_1$/LDPE.

In Example 2, the multi-layer film comprises the same construction as the film of Example 1, but with 80% $EPC_1$+20% $SEBS_1$. In both examples 1 and 2, the five layer films are coextruded and thereafter the low density polyethylene sacrificial layers are stripped away to create three layer films as described.

In Example 3, the multi-layer film comprises 90% PP+10% $SEBS_1$/99.9% Modified EVA+0.1% $Na_2CO_3$/99.9% $EVA_2$+0.1% $Na_2CO_3$/99.9% Modified EVA+0.1% Na$_2$CO$_3$/99.3% Flexible Copolyester$_1$+0.7% HMWS.

In Example 4, the multi-layer film comprises the same construction as Example 3, but with 80% PP and 20% SEBS$_1$.

Four films 5a, 5b, 5c, and 5d were actually made and had the general construction LDPE/80% EPC$_2$+20% SEBS$_2$/EVA$_3$+Na$_2$CO$_3$/Modified EVA/99.5% Flexible Copolyester$_2$+0.5% HMWS.

In each of these four films, the high molecular weight stabilizer was added in the form of a masterbatch containing 90% of the Ecdel TM 9965 resin and 10% of the Irganox TM 1010 stabilizer. The masterbatch made up 5% of the outer layer.

In film 5a, the central layer comprised 99.95% EVA$_3$+0.05% Na$_2$CO$_3$. The modified EVA layer contained 0.1% Na$_2$CO$_3$ by weight of the polymeric adhesive layer.

In film 5b, the central layer comprised 99.625% EVA$_3$+0.375% Na$_2$CO$_3$.

In film 5c, the central layer comprised 99.75% EVA$_3$+0.25% Na$_2$CO$_3$.

In film 5d, the central layer comprised 99.5% EVA$_3$+0.5% Na$_2$CO$_3$.

In structures 5a through 5d, the blend layer was directly adhered to the central EVA layer without an intermediate layer of modified EVA. Thus, films 5a through 5d were coextruded as a five layer film. The sacrificial LDPE layer was then stripped away, in each case, to produce a four layer film suitable for fabrication into a medical solution pouch or other container.

In Example 6, the multi-layer film comprises the same construction as the film of Example 5, but with EVA$_4$ as the central layer and with a layer of modified EVA disposed between and adhering the central EVA layer to the SEBS blend layer.

In Example 7, a multi-layer film comprises the same construction as the films of Example 6, but with a blend layer comprising 90% EPC$_1$+10% SEBS$_1$.

In Example 8 a multi-layer film comprises 90% EPC$_1$+10% SEBS$_1$/99.9% modified EVA+0.1% Na$_2$CO$_3$/99.9% EVA$_3$+0.1% Na$_2$CO$_3$/99.9% modified EVA+0.1% Na$_2$CO$_3$/99.3% flexible copolyester$_2$+0.7% HMWS.

In Example 9, a multi-layer film comprises the same construction as in Example 8, but without the presence of SEBS$_1$ in the sealant layer. In addition, the film of Example 9 includes a sacrificial layer of LDPE adhered to the sealant layer when the film is coextruded.

In Example 10, a multi-layer film comprises the same construction as in Example 9, but with a thicker sealant (EPC$_1$) layer than in Example 9.

In Example 11, a multi-layer film comprises the same construction as in Example 8, but without the presence of SEBS$_1$ in the sealant layer. Thus, the film of Example 3 has a sealant layer comprising simply EPC$_1$.

In Example 12, a multi-layer film is produced having substantially the same construction as in Example 4, but with a sealant layer comprising EPC$_1$, and with a sacrificial layer (LDPE) adhered to the sealant layer during coextrusion and thereafter removed.

In Example 13, a multi-layer film is produced having substantially the same construction as in the film of Example 12, but with a sealant layer comprising an ethylene propylene block copolymer (M7853-368A available from Eastman), and with no sacrificial layer adhered to the sealant layer during coextrusion.

In Example 14, a five layer film is produced having the same construction as the film of Example 1, but without the presence of SEBS$_1$ in the EPC layers.

In some of the films such as those of Examples 1 and 2, maintaining sufficient melt strength (strength of the plastic while in a molten state) can be a problem.

Adequate melt strength can be ensured by splitting the melt stream of the central EVA material (Elvax 3175 in the examples) into two split melt streams, and coextruding therewith a fractional melt index (FMI) EVA such as Elvax 3135 or 3165 both available from du Pont. This would in effect provide a seven layer structure before stripping the outer LDPE sacrificial layers. In this alternate construction, the total EVA content, including the split central EVA layer and the intermediate fractional melt index EVA would still comprise preferably between 60 and 90%, and more preferably about 80% of the total film thickness exclusive of the sacrificial layers. At least one, and preferably all of the EVA layers include between about 0.01% and 1% of a carbonate of an alkali metal.

Films in accordance with the present invention are preferably cross-linked. This is preferably done by irradiation, i.e. bombarding the film with particulate and non-particulate radiations such as high energy electrons from an accelerator or cobalt-60 gamma rays, to cross-link the materials of the film. Cross-linking increases the structural strength of film and/or the force at which the material can be stretched before tearing apart, and may also improve the optical properties of the film and change the high temperature properties of the film. A preferred irradiation dosage level is in the range of from about 2 Megarads (M.R.) to about 8 M.R.

Cross-linking may also be accomplished chemically by the use of peroxides.

Pouches made in accordance with the present invention may be sealed by various means well known in the art, including radiation frequency (R.F.) sealing, impulse and hot bar sealing.

The films according to the present invention are preferably formed by cast coextrusion. A hot blown process may also be employed, although optical properties of the resulting pouch would be inferior to those from a cast coextrusion process.

It should be noted that the detailed description and specific examples which indicate the presently preferred embodiments of the invention are given by way of illustration only. Various changes and modifications within the spirit and scope of the claims will become apparent to those of ordinary skill in the art upon review of the above detailed description and examples.

For example, other elastomers such as styrene butadiene styrene or isoprene styrene isoprene block copolymers may in some cases be suitable alternative materials in replacement of the SEBS material.

Also, the fractional melt index EVA is believed to be a material which can be introduced at almost any position in the multilayer film structure of the present invention to increase the viscosity of the coextruded melt and thereby increase the melt strength of the coextruded film.

The percentages given above for the various examples are exclusive of small amounts of processing additives which are sometimes added to one or more of the resins prior to extrusion. The nature, use and applicability of such materials is well known in the art.

What is claimed is:

1. An impact resistant film comprising:

(a) a first outer layer of a blend of ethylene propylene copolymer and a styrene ethylene butylene styrene copolymer;
(b) an intermediate layer comprising ethylene vinyl acetate copolymer and a carbonate of an alkali metal; and
(c) a second outer layer, disposed on the opposite side of the intermediate layer from the first outer layer, of a blend of ethylene propylene copolymer and a styrene ethylene butylene styrene copolymer.

2. The impact resistant film of claim 1 wherein the two outer layers each comprise a blend of 70% to 95% ethylene propylene copolymer, and 5% to 30% of a styrene ethylene butylene styrene copolymer.

3. The impact resistant film of claim 1 wherein the ethylene vinyl acetate copolymer has a vinyl acetate content of between about 18% and 35% by weight of the ethylene vinyl acetate copolymer.

4. The impact resistant film of claim 1 further comprising an outermost layer of low density polyethylene adhered to at least one of the two outer layers.

5. The film of claim 1 wherein the film is cross-linked.

6. The impact resistant film of claim 1 wherein the carbonate of an alkali metal comprises between about 0.01% and 1% by weight of the intermediate layer.

7. An impact resistant film comprising:
a) a first outer layer comprising a blend of ethylene propylene copolymer and styrene ethylene butylene styrene copolymer;
b) a central layer comprising ethylene vinyl acetate copolymer;
c) a second outer layer, disposed on the opposite side of the intermediate layer from the first outer layer, comprising a copolyester; and
d) a polymeric adhesive layer disposed between and adhering the central layer to the second outer layer;
e) at least one of the central layer and the polymeric adhesive layer further comprising a carbonate of an alkali metal.

8. The impact resistant resistant film of claim 7 wherein the first outer layer comprises a blend of 70% to 95% ethylene propylene copolymer, and 5% to 30% of a styrene ethylene butylene styrene copolymer.

9. The impact resistant film of claim 7 wherein the ethylene vinyl acetate copolymer of the central layer has a vinyl acetate content of between about 18% and 35% by weight of the ethylene vinyl acetate copolymer.

10. The impact resistant film of claim 7 wherein the polymeric adhesive comprises a chemically modified ethylene unsaturated ester copolymer.

11. The impact resistant film of claim 7 wherein the polymeric adhesive comprises a chemically modified polymeric adhesive selected from the group consisting of:
a) modified ethylene vinyl acetate copolymer;
b) modified ethylene methyl acrylate copolymer;
c) modified linear low density polyethylene;
d) modified very low density polyethylene;
e) modified high density polyethylene; and
f) modified polypropylene.

12. The impact resistant film of claim 7 further comprising an additional layer, disposed on the opposite surface of the first outer layer from the central layer, comprising a low density polyethylene.

13. The film of claim 5 wherein the film is cross-linked.

14. The impact resistant film of claim 7 wherein the carbonate of an alkali metal comprises between about 0.01% and 1% by weight of at least one of the central and polymeric adhesive layers.

15. An impact resistant film comprising:
a) a first outer layer of a blend of ethylene propylene copolymer and a styrene ethylene butylene styrene copolymer;
b) a central layer comprising a fractional melt index ethylene vinyl acetate copolymer;
c) a second outer layer, disposed on the opposite side of the central layer from the first outer layer, comprising a material selected from the group consisting of
(i) a blend of ethylene propylene copolymer and styrene ethylene butylene styrene copolymer, and
(ii) copolyester; and
d) an intermediate layer disposed between each of the two outer layers and the central layer respectively and comprising ethylene vinyl acetate copolymer having a melt index greater than about 1.0;
e) an optional polymeric adhesive layer disposed between and adhering the second outer layer to the central layer, when the second outer layer is a copolyester;
f) at least one of the central layer and intermediate layers further comprising a carbonate of an alkali metal.

16. The impact resistant film of claim 15 wherein the two outer layers each comprise a blend of 70% to 95% ethylene propylene copolymer, and 5% to 30% of a styrene ethylene butylene styrene copolymer.

17. The impact resistant film of claim 13 wherein the ethylene vinyl acetate copolymer of the intermediate layers has a vinyl acetate content of between about 18% and 35% by weight of the ethylene vinyl acetate copolymer.

18. The impact resistant film of claim 13 further comprising an outermost layer of low density polyethylene adhered to at least one of the two outer layers.

19. The film of claim 15 wherein the film is cross-linked.

20. The impact resistant film of claim 15 wherein the carbonate of an alkali metal comprises between about 0.01% and 1% by weight of at least one of the central layer and intermediate layers.

21. An impact resistant film comprising:
a) a first outer layer comprising a blend of ethylene propylene copolymer and a styrene ethylene butylene styrene copolymer;
b) a central layer comprising ethylene vinyl acetate copolymer having a melt index greater than about 1.0;
c) a second outer layer, disposed on the opposite side of the central layer from the first outer layer, comprising a material selected from the group consisting of
i) a blend of ethylene propylene copolymer and styrene ethylene butylene styrene copolymer, and
ii) copolyester;
d) an intermediate layer disposed between the first outer layer and the central layer and comprising a fractional melt index ethylene vinyl acetate copolymer; and
e) an optional polymeric adhesive layer disposed between and adhering the second outer layer to the central layer, when the second outer layer is a copolyester;

f) at least one of the central layer, optional polymeric adhesive layer, and intermediate layer further comprising a carbonate of an alkali metal.

22. The impact resistant film of claim 21 wherein the first outer layer comprises a blend of 70% to 95% ethylene propylene copolymer, and 5% to 30% of a styrene ethylene butylene styrene copolymer.

23. The impact resistant film of claim 21 wherein the ethylene vinyl acetate copolymer of the intermediate layer has a vinyl acetate content of between about 18% and 35% by weight of the ethylene vinyl acetate copolymer.

24. The impact resistant film of claim 21 wherein the polymeric adhesive comprises a chemically modified ethylene unsaturated ester copolymer.

25. The impact resistant film of claim 24 wherein the chemically modified ethylene unsaturated ester copolymer is an adhesive selected from the group consisting of chemically modified ethylene methyl acrylate copolymer and chemically modified ethylene vinyl acetate copolymer.

26. The film of claim 21 wherein the film is croslinked.

27. The impact resistant film of claim 21 wherein the carbonate of an alkali metal comprises between about 0.01% and 1% by weight of at least one of the central, polymeric adhesive, and intermediate layers.

28. An impact resistant film comprising;
a) a first outer layer comprising a blend of ethylene propylene copolymer and styrene ethylene butylene styrene copolymer;
b) a central layer comprising ethylene vinyl acetate copolymer;
c) a second outerlayer, disposed on the opposite side of the first outer layer from the central layer, comprising copolyester, and between about 0.3% and 1%, by weight of the copolyester, of a high molecular weight stabilizer; and
d) a polymeric adhesive layer disposed between and adhering the central layer to the second outer layer.

29. The impact resistant film of claim 28 wherein at least one of the central and polymeric adhesive layers further comprises a carbonate of an alkali metal.

30. An impact resistant film comprising:
a) a first outer layer comprising a blend of ethylene propylene copolymer and a styrene ethylene butylene styrene copolymer;
b) a central layer comprising ethylene vinyl acetate copolymer having a melt index greater than about 1.0;
c) a second outer layer, disposed on the opposite side of the first outer layer from the central layer, comprising copolyester, and between about 0.3% and 1%, by weight of the copolyester, of a high molecular weight stabilizer;
d) an intermediate layer disposed between the first outer layer and the central layer and comprising a fractional melt index ethylene vinyl acetate copolymer; and
e) a polymeric adhesive layer disposed between and adhering the second outer layer to the central layer.

31. The impact resistant film of claim 30 wherein at least one of the central, intermediate, and polymeric adhesive layers further comprises a carbonate of an alkali metal.

* * * * *